United States Patent [19]
Crotty, III

[11] Patent Number: 5,984,398
[45] Date of Patent: Nov. 16, 1999

[54] VEHICLE SUN VISOR WITH A YIELDABLE EDGE

[75] Inventor: Willard E. Crotty, III, Quincy, Mich.

[73] Assignee: Crotty Corporation, Quincy, Mich.

[21] Appl. No.: 08/964,605

[22] Filed: Nov. 5, 1997

[51] Int. Cl.[6] .................................................. B60J 03/00
[52] U.S. Cl. ...................................... 296/97.1; 296/97.8
[58] Field of Search .................................. 296/97.1, 97.8

[56] References Cited

U.S. PATENT DOCUMENTS

| | | | |
|---|---|---|---|
| 3,610,680 | 10/1971 | Brady | 296/97.1 |
| 3,871,703 | 3/1975 | Accatino | 296/97.1 |
| 4,858,983 | 8/1989 | White et al. . | |
| 4,982,991 | 1/1991 | Lawassani et al. . | |
| 4,998,765 | 3/1991 | Van Order et al. | 296/97.1 X |
| 5,004,289 | 4/1991 | Lanser et al. | 296/97.12 |
| 5,007,532 | 4/1991 | Binish | 296/97.1 |
| 5,042,867 | 8/1991 | Crotty, III et al. | 296/97.8 |
| 5,131,711 | 7/1992 | Laferle | 276/97.1 |
| 5,148,588 | 9/1992 | Prillard | 296/97.1 X |
| 5,205,635 | 4/1993 | Van Order et al. | 362/83.1 |
| 5,205,639 | 4/1993 | White et al. | 362/137 |
| 5,295,725 | 3/1994 | Jones | 296/97.1 |
| 5,327,633 | 7/1994 | Riddle, Jr. . | |
| 5,338,082 | 8/1994 | Miller | 296/97.1 |
| 5,365,416 | 11/1994 | Peterson | 362/135 |
| 5,580,118 | 12/1996 | Crotty, III | 296/97.12 |
| 5,678,879 | 10/1997 | Mailander et al. | 296/97.1 |
| 5,823,603 | 10/1998 | Crotty, III . | |
| 5,860,690 | 1/1999 | Dellinger et al. | 296/97.1 |
| 5,887,933 | 3/1999 | Peterson | 296/97.1 |

OTHER PUBLICATIONS

European Search Report, Application No. EP 97 11 2492, dated Dec. 22, 1998.

*Primary Examiner*—D. Glenn Dayoan
*Assistant Examiner*—Lori L. Coletta
*Attorney, Agent, or Firm*—Baker & Daniels

[57] ABSTRACT

A sun visor assembly for a vehicle having a yieldable edge. The visor assembly has a rotatable visor body which may be positioned against the headliner in the roof of the vehicle or against the windshield or side window of the vehicle. The visor body includes a relatively rigid inner foundation member and a more flexible outer covering. The outer covering projects beyond the borders of the foundation member to form the edges of the visor body. The edges formed by the projecting outer covering are yieldable upon impact and may thereby cushion the force exerted by the visor body against a body impacting the yieldable edge of the visor body. The outer longitudinal edge of the visor body has a width of at least approximately 0.75 inches and the visor body may also include yieldable transverse edges.

20 Claims, 3 Drawing Sheets

VEHICLE SUN VISOR WITH A YIELDABLE EDGE

BACKGROUND OF THE INVENTION

1. Field of the Invention

The present invention relates to vehicle sunshade visors.

2. Description of the Related Art

It is well known to provide a sun visor for the windshield of a vehicle wherein the sun visor is mounted on the vehicle body roof for movement between a storage position adjacent the vehicle roof headliner, a first use position adjacent the windshield, and a second use position adjacent a side door window. A conventional sun visor comprises a solid inner core board of a rigid material, such as pressed wood, and an outer upholstery covering such as a foam-backed cloth adhered to or otherwise connected to a paper backing material. The covering is folded over the core board and is sewn along a seam circumjacent the periphery of the core board. More recently, sun visors have been constructed with a molded plastic inner core. The disclosure of U.S. Pat. No. 5,365,416, which is assigned to the assignee of the present application, illustrates a sun visor having a plastic inner core and an outer covering assembly folded over the plastic core and is expressly incorporated herein by reference. It is also known to manufacture the plastic inner core using modular parts as disclosed in U.S. Pat. No. 5,580,118 and U.S. patent application Ser. No. 08/703,819, both assigned to the assignee of the present application, the disclosures of which illustrate a variety of modular core components which may be used in the construction of a sun visor assembly and which are expressly incorporated herein by reference. The outer covering assembly which is folded over the molded plastic core typically consists of a relatively rigid foundation of a paperboard material and an outer upholstery covering folded over the rigid foundation and sewn along a seam circumjacent the periphery of the paperboard foundation.

SUMMARY OF THE INVENTION

The present invention provides a visor assembly having an outer covering which projects beyond a rigid foundation material to form a yieldable edge. When impacted, the yieldable edge of the present invention provides less resistance than an edge formed with an underlying rigid foundation or core.

The invention comprises, in one form thereof, a visor assembly having an outer upholstery covering and a rigid paperboard foundation. The rigid paperboard foundation does not extend to the outer longitudinal edge of the visor opposite the visor support rod. The outer longitudinal edge of the visor is, instead, defined by a projecting strip of upholstery material.

An advantage of the present invention is that the outer longitudinal edge of the visor is yieldable and relatively easily deformed upon impact. Thus, if an occupant of the vehicle strikes the outer longitudinal edge of the visor assembly during a vehicular accident, the yieldable edge will reduce the possibility, or extent, of any injury caused by impacting the visor.

Another advantage of the present invention is that the visor assembly requires less material than a conventional visor assembly and thereby reduces the manufacturing costs.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
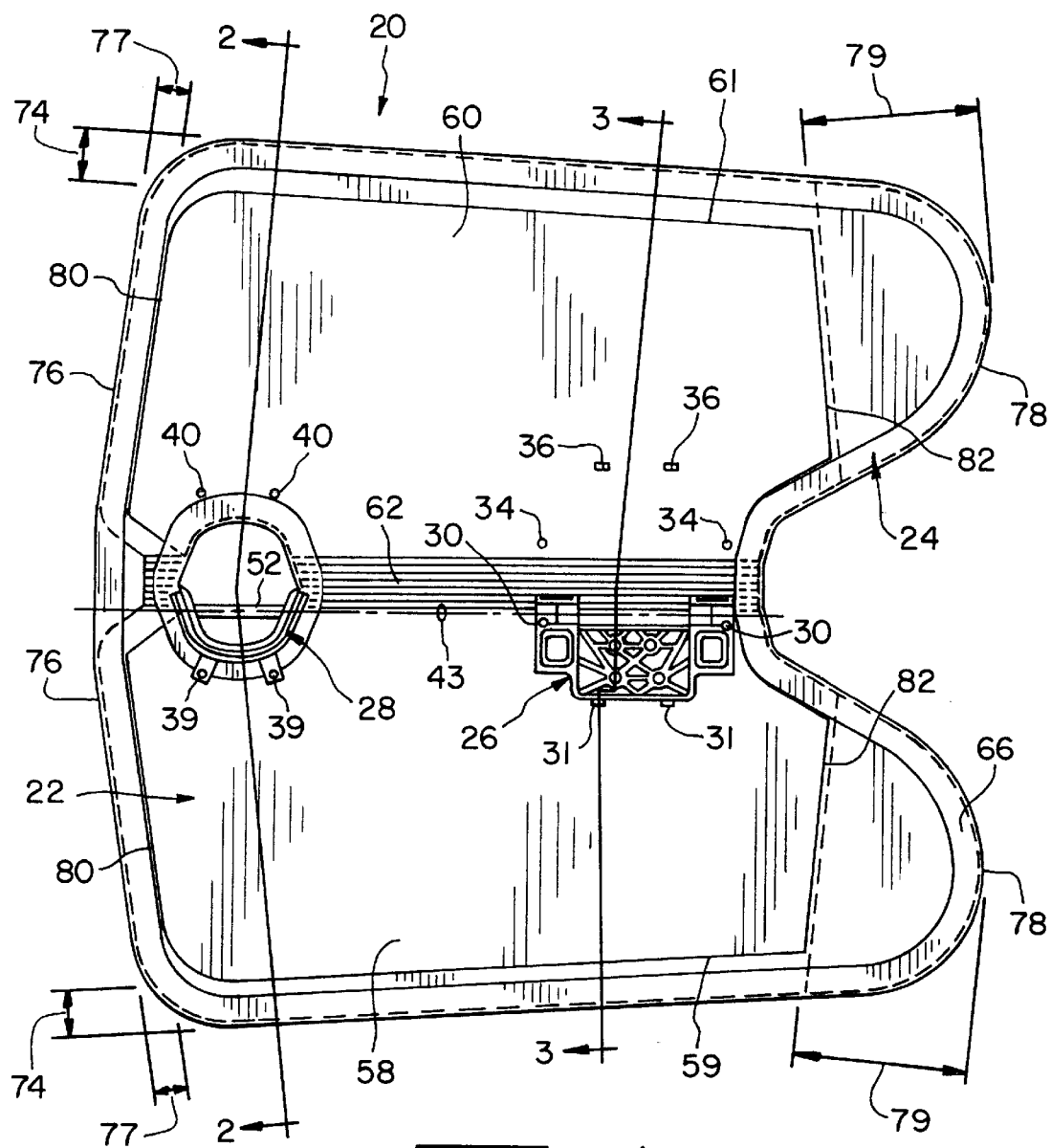
FIG. 1 is a top view of a partially assembled visor embodying the present invention.

Corresponding reference characters indicate corresponding parts throughout the several views. Although the drawings represent an embodiment of the present invention, the drawings are not necessarily to scale and certain features may be exaggerated. The embodiment described below is set out as an exemplification of the invention. The described embodiment is not intended to be exhaustive or to be construed as limiting the scope of the invention to the precise form disclosed.

DESCRIPTION OF THE PRESENT INVENTION

Referring now to the drawings and particularly to FIG. 1, there is shown a partially assembled visor assembly 20 in accordance with the present invention. Visor assembly 20 includes an inner foundation member 22, an outer covering 24, and two modular plastic core members, i.e., hinge member 26 and pin support member 28.

In the illustrated embodiment, foundation member 22 is formed of a paperboard material having a thickness of 0.080 inches. Paperboard foundations have alternative thicknesses, including thicknesses as thin as approximately 0.060 inches, may also be used. Foundation member 22 provides the underlying structure of visor assembly 20. Other materials having suitable stiffness and weight characteristics may also be used to form foundation member 22. The modular core members are secured to foundation member 22 prior to folding foundation member 22 and securing the outer periphery of covering 24. To secure hinge member 26 to foundation member 22, alignment pegs 30, 31, 32 on hinge member 26 are inserted into apertures 34, 36 in foundation member 22. A foot 33, shown in FIGS. 3 and 5, extending from one end of peg 32 provides additional resistance to the dislodgement of hinge member 26 during use of visor assembly 20. Similarly, alignment pegs 38, 39 located on pin support member 28 are snap fit into apertures 40 to secure pin support member 28 to foundation member 22.

Hinge and pin support members 26, 28 are formed of molded plastic, preferably of ABS or polypropylene but may also be formed of other suitable materials. Although the illustrated embodiment utilizes only hinge member 26 and pin support member 28 as modular core members, a wide variety of alternative, or additional, core and accessory members can also be utilized with the present invention. For example, alternative visor assemblies may include illuminated vanity mirrors or extension panels which slide into and out of the visor assembly to selectively increase the shading area of the visor.

Figure 6:
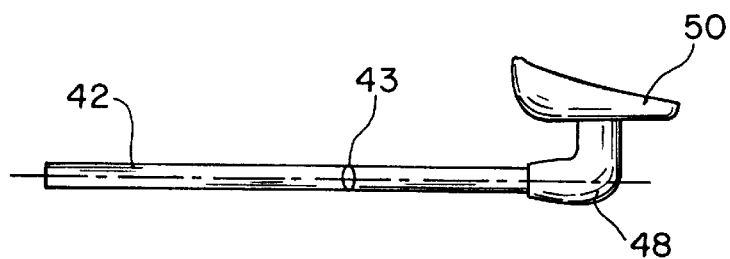
FIG. 6 is a front view of a visor support rod assembly.
Figure 5:
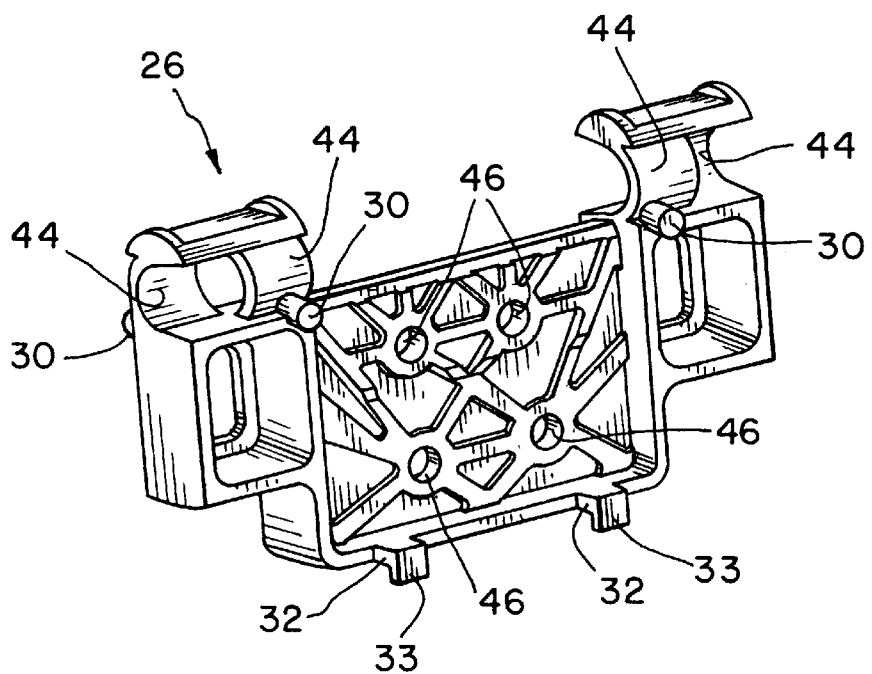
FIG. 5 is a perspective view of a hinge member.

Referring to FIGS. 1, 5 and 6, hinge member 26 is not only attached to foundation member 22 but is also rotatably attached to visor support rod 42. Visor support rod 42 is inserted through a passage in hinge member 26 defined by curved elements 44. A metal clip (not shown) is attached to hinge member 26 by rivets or other fasteners inserted through apertures 46. The metal clip is folded over the middle section of hinge member 26 to form a continuation of the passage defined by curved elements 44. The metal clip and elements 44 permit support rod 42 to rotate relative to hinge member 26. The metal clip, however, may also engage flat lands (not shown) on visor support rod 42 to facilitate the maintenance of visor assembly 20 in predetermined rotational positions, such as in a storage position against the headliner of a vehicular roof. The visor support rod assembly also includes an elbow 48 and a mounting bracket 50. Mounting bracket 50 is used to mount the visor assembly in a vehicle.

The present invention may also utilize a hollow visor support rod. Hollow support rods are well known in the art and allow electrical wiring to be routed to the interior of the visor assembly where the wiring may be connected to an amenity unit such as an illuminated vanity mirror.

Pin support member 28 includes a pin 52 which is attachable to a retention clip (not shown) conventionally located near the center of a vehicular windshield to thereby support the free end of visor assembly 20. Pin 52 is preferably coaxially positioned with visor support rod 42 on a longitudinal axis of visor assembly 20 defined by visor support rod 42. The location of longitudinal axis 43 with respect to visor assembly 20 and visor support rod 42 is respectively depicted in FIGS. 1 and 6.

Rotating visor assembly 20 about the longitudinal axis defined by visor support rod 42 permits the generally planar elongate visor body 21 to be moved between a storage position adjacent the headliner of a vehicle and a shading position adjacent either a windshield or side window. Visor assembly 20 also includes a second axis defined by that extension of elbow 48 which is attached to mounting bracket 50 and is generally transverse to the longitudinal axis. Rotation of visor body 21 about this second axis permits visor body 21 to be selectively positioned adjacent either the windshield or side window of a vehicle.

Figure 2:
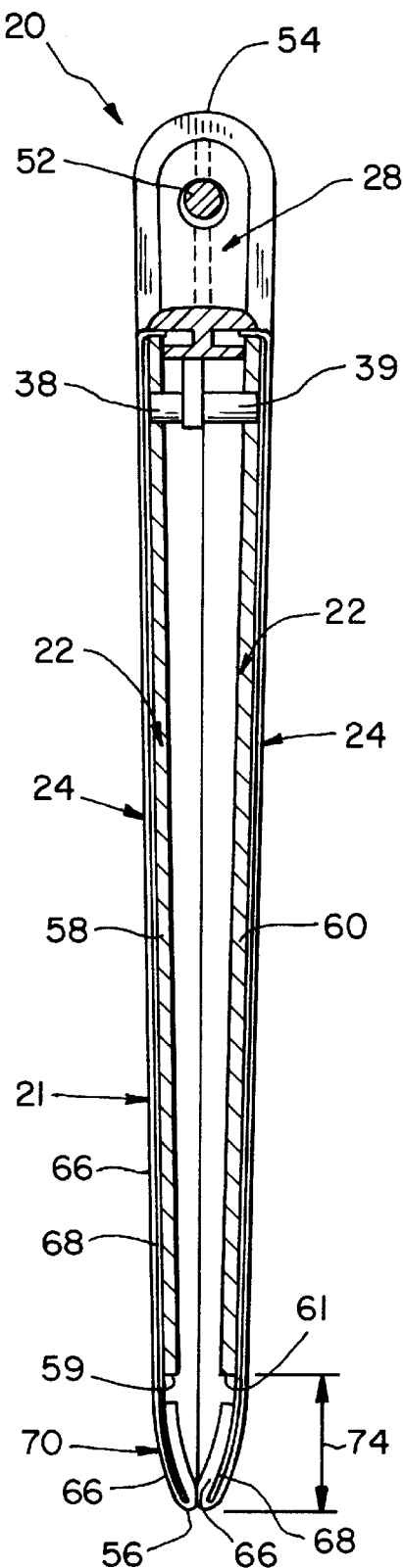
FIG. 2 is a cross sectional view of an assembled visor taken along line 2—2 of FIG. 1.
Figure 3:
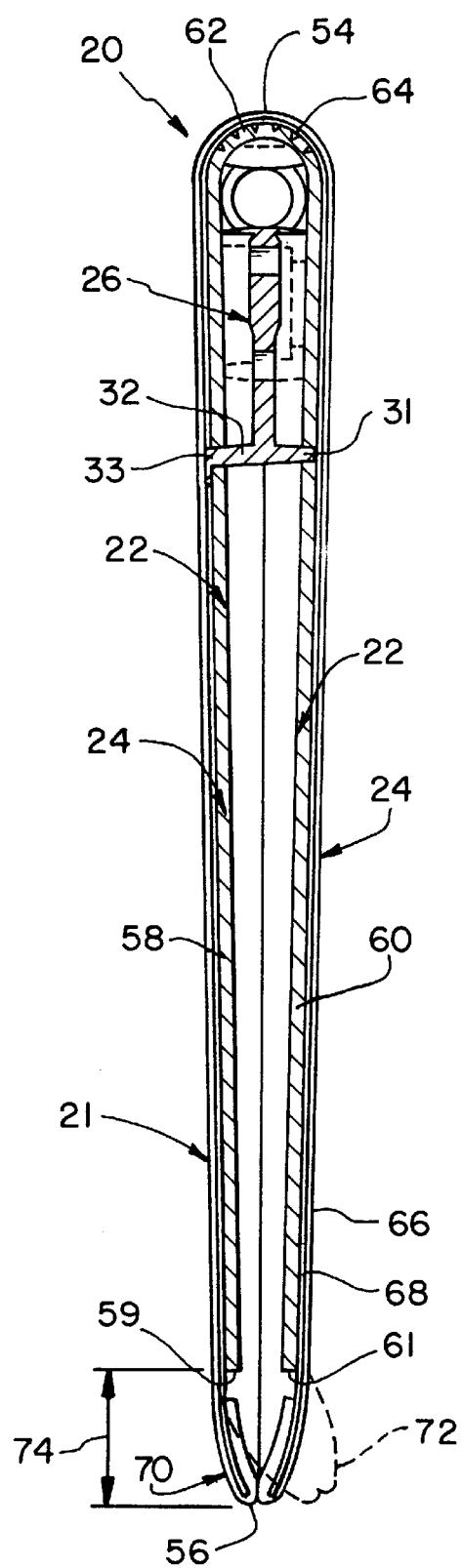
FIG. 3 is a cross sectional view of an assembled visor taken along line 3—3 of FIG. 1.
Figure 4:
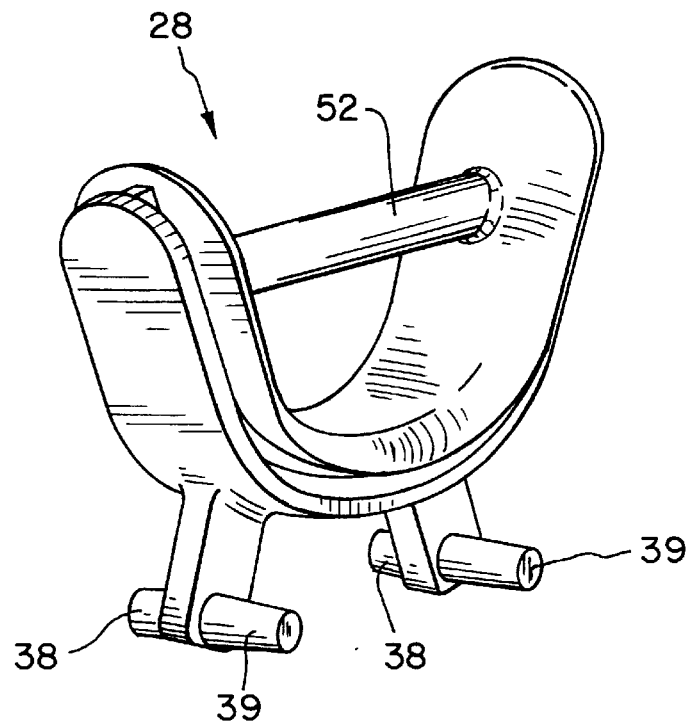
FIG. 4 is a perspective view of a support pin member.

As best seen in FIGS. 2 and 3, the visor body 21 has a first longitudinal edge 54 located proximate the longitudinal axis about which visor body 21 is rotatable. The visor body 21 also includes a second outer longitudinal edge 56 located distally from the longitudinal axis. Foundation member 22 forms a shell which provides the underlying structure and general shape of the visor body and may thereby cantileveredly support that portion of the visor body 21 which extends distally of the longitudinal axis. Foundation member 22 also provides a connecting structure between hinge member 26 and pin support member 28.

As shown in FIGS. 1–3, foundation member 22 includes two flaps 58, 60 connected by a hinge section 62. The hinge section 62 is disposed at first longitudinal edge 54 of visor body 21 and includes a plurality of score lines 64, or shallow grooves, located on the outward facing surface of foundation member 22. As best seen in FIG. 3, score lines 64 facilitate the bending of hinge section 62 during assembly of the visor.

Flaps 58, 60 extend from opposite ends of hinge section 62 towards the outer longitudinal edge 56 of the visor body 21. Flaps 58, 60 do not, however, extend the full width of visor body 21 to outer longitudinal edge 56. Instead, flaps 58, 60 terminate at a common distal border defined by longitudinally extending distal borders 59, 61 located approximately 0.75 inches inward of outer longitudinal edge 56.

Outer covering 24 is disposed on the outward facing surface of foundation member 22 and forms the exterior surface of the assembled visor body 21. Outer covering 24 may be formed of suitable upholstery materials known in the art such as fabric, vinyl, or cloth with a bonded foam backing. In the illustrated embodiment, outer covering 24 includes a cloth and bonded foam layer 66 and a paper backing 68. The cloth and bonded foam layer 66 covers one side of paper backing 68 and is folded over the edges of paper backing 68. Cloth and bonded foam layer 66 is adhesively, or otherwise, attached to paper backing 68 in a well known manner. The cloth and bonded foam layer 66 is positioned such that the paper backing 68 and the bonded foam layer are in direct contact and the cloth material forms the exterior surface of visor body 21.

During assembly of the visor assembly 20, core members 26, 28 are first aligned on one of the splayed open flaps 58, 60 of foundation member 22, as shown in FIG. 1. Outer cover 24 is secured to foundation member 22 with adhesives or other suitable means. Flaps 58, 60 are then folded over by bending hinge section 62 to place flaps 58, 60 into their assembled position. As flaps 58, 60 are moved into their final assembled position the remaining alignment pegs 30, 31, 39 snap fit into engagement with their respective holes 34, 36, 40 to thereby retain hinge and pin support members 26, 28 in their proper positions within visor assembly 20. The outer covering 24 is then secured together along its outer periphery with stitching, adhesives, bonding or other suitable attachment means. Although not required, adhesive may also be used to secure foundation member 22 to core members 26, 28.

Paper backing material 68 has a thickness which is sufficient to maintain the shape of a longitudinal extending distal strip 70. Paper backing material 68, however, is relatively flexible in comparison with foundation member 22 and allows distal strip 70 to yield when subjected to relatively small forces. In the illustrated embodiment, paper backing 68 has a thickness of approximately 0.026 inches. FIG. 3 includes a dashed outline 72 of distal strip 70 in a deformed state which may result from the application of pressure to the distal strip. Application of differently oriented forces to distal strip 70 will result in alternative deformations of distal strip 70. Paper backing 68 has sufficient strength to return visor body 21 to its original shape after the deformation of distal strip 70. The application of sufficiently large forces and/or the repeated application of smaller deforming forces, however, may possibly destroy or permanently deform distal strip 70.

Yieldable distal strip 70 extends longitudinally along the outer distal portion of visor body 21 and projects beyond distal borders 59, 61 of foundation member 22 to define outer longitudinal edge 56. The width 74 of distal strip 70 extends transverse to the outer longitudinal edge 56 from outer edge 56 to distal borders 59, 60 of foundation member 22 and is 0.75 inches.

Although width 74 of distal strip 70 is not required to be precisely 0.75 inches, width 74 should be sufficient to permit the edge to deform and thereby blunt the force exerted by visor body 21 against any object impacting outer longitudinal edge 56. Width 74 should also not be so great that distal strip 70 loses its ability to maintain its shape or sags under the effects of gravity.

Flaps 58, 60 have a longitudinal length which is less than the length of visor body 21. Visor body 21 has transverse edges 76, 78 on opposite sides of visor body 21 which connect longitudinal edges 54, 56. The transverse borders 80, 82 of foundation member 22 are located inwardly of edges 76, 78 and thereby form transverse yieldable strips along transverse edges 76, 78. The transverse yieldable strip located along edge 76 has a width 77, in the longitudinal direction, of approximately 0.5 inches. The transverse strip located along edge 78 is larger and forms a lobe having a much larger width 79. The transverse yieldable strips cushion impact forces in the same manner as distal strip 70 and also reduce the amount of material required to manufacture visor assembly 20.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A visor assembly for a vehicle, said visor assembly comprising:
   a visor support rod for rotatably supporting said visor assembly, said visor support rod defining a longitudinal axis;
   a generally planar elongate visor body having a first longitudinal edge disposed proximate said longitudinal axis and an outer longitudinal edge disposed distally from said longitudinal axis, said visor body rotatable about said longitudinal axis;
   a relatively rigid inner foundation layer disposed between said longitudinal axis and said outer longitudinal edge, said foundation layer terminating at a longitudinally extending distal border;
   a backing material disposed adjacent said relatively rigid inner foundation layer; and
   a yieldable longitudinally extending distal strip disposed between said distal border of said foundation layer and said outer longitudinal edge, said yieldable distal strip including said backing material and having a width transverse to said outer longitudinal edge of at least about 0.75 inches whereby said outer longitudinal edge is a yieldable edge.

2. The visor assembly of claim 1 wherein said foundation layer comprises a paperboard layer having a thickness of no less than approximately 0.080 inches.

3. The visor assembly of claim 1 wherein said visor assembly further comprises an outer covering comprising a relatively flexible material, said outer covering forming an exterior surface of said visor body, a portion of said outer covering projecting beyond said distal border of said foundation layer and forming said distal strip.

4. The visor assembly of claim 3 wherein said outer covering comprises a cloth material having a paper backing, said paper backing having a thickness no greater than approximately 0.026 inches, and wherein said outer covering is positioned over said foundation layer whereby said cloth material defines said exterior surface.

5. The visor assembly of claim 1 wherein said foundation layer comprises a paperboard layer comprising two flaps and a hinge section connecting said flaps, said hinge section disposed at said first longitudinal edge, and each of said flaps respectively extending from an opposite end of said hinge section towards said outer longitudinal edge whereby said flaps terminate at and define said distal border, said longitudinal axis disposed between said flaps near said hinge section.

6. The visor assembly of claim 5 wherein said flaps have a longitudinal length less than said visor body, whereby said visor body further comprises a yieldable transverse strip.

7. The visor assembly of claim 5 further comprising a plastic core member disposed between said flaps, said core member rotatably engaged with said support rod.

8. The visor assembly of claim 1 wherein said visor body has first and second transverse edges connecting said first and second longitudinal edges, said first and second transverse edges defined by yieldable strips having a width of at least approximately 0.5 inches.

9. A visor assembly for a vehicle, said visor assembly comprising:
   a visor support rod for rotatably supporting said visor assembly, said visor support rod defining a longitudinal axis;
   a generally planar elongate visor body having a first longitudinal edge disposed proximate said longitudinal axis and an outer longitudinal edge disposed distally from said longitudinal axis, said visor body rotatable about said longitudinal axis;
   a relatively rigid inner foundation layer disposed between said longitudinal axis and said outer longitudinal edge, said foundation layer terminating at a longitudinally extending distal border; and
   an outer covering disposed exterior to and covering said inner foundation layer, said outer covering comprising a relatively flexible material having a backing material, said outer covering projecting distally of said distal border and defining said outer longitudinal edge, said outer covering including a yieldable distal strip extending longitudinally and disposed between said distal border of said foundation layer and said outer longitudinal edge, said yieldable distal strip having a width transverse to said outer longitudinal edge of at least about 0.75 inches whereby said outer longitudinal edge is a yieldable edge.

10. The visor assembly of claim 9 wherein said foundation layer comprises a paperboard layer having a thickness of no less than approximately 0.080 inches.

11. The visor assembly of claim 9 wherein said outer covering comprises a cloth material having a paper backing, said paper backing having a thickness no greater than approximately 0.026 inches, and wherein said outer covering is positioned over said foundation layer whereby said cloth material defines an exterior surface of said visor body.

12. The visor assembly of claim 9 wherein said foundation layer has first and second transverse borders extending from said distal border towards said longitudinal axis and said outer covering projects longitudinally beyond said transverse borders thereby forming first and second transversely extending yieldable strips each having a width of at least approximately 0.5 inches.

13. The visor assembly of claim 9 wherein said foundation layer comprises a paperboard layer comprising two flaps and a hinge section connecting said flaps, said hinge section disposed at said first longitudinal edge, and each of said flaps respectively extending from an opposite end of said hinge section towards said outer longitudinal edge whereby said flaps terminate at and define said distal border, said longitudinal axis disposed between said flaps near said hinge section.

14. The visor assembly of claim 13 further comprising a plastic core member disposed between said flaps, said core member rotatably engaged with said support rod.

15. A visor assembly for a vehicle, said visor assembly comprising:
   a visor support rod for rotatably supporting said visor assembly, said visor support rod defining a longitudinal axis;
   a relatively rigid inner foundation assembly including a first generally planar elongate flap extending from near said longitudinal axis to a longitudinally extending distal border of said first flap, said foundation assembly rotatable about said longitudinal axis; and an outer covering disposed over said first flap, said outer covering comprising a relatively flexible material having a backing material and defining an outer longitudinal edge of said visor assembly, said outer longitudinal edge disposed distally from said longitudinal axis, said outer covering including a yieldable distal strip extending longitudinally and disposed between said distal border of said foundation layer and said outer longitudinal edge, said yieldable distal strip having a width transverse to said outer longitudinal edge of at least about 0.75 inches whereby said outer longitudinal edge is a yieldable edge.

16. The visor assembly of claim 15 wherein said foundation assembly further comprises a hinge section connected to said first flap near said longitudinal axis and a second flap extending from said hinge section to a second longitudinally extending distal border of said second flap, said second distal border aligned with said distal border of said first flap; said outer covering disposed over said second flap and hinge section and defining an exterior surface of said visor assembly.

17. The visor assembly of claim 16 wherein said flaps comprise a paperboard layer having a thickness of no less than approximately 0.060 inches.

18. The visor assembly of claim 16 wherein said outer covering comprises a cloth material having a paper backing, said paper backing having a thickness no greater than approximately 0.026 inches, and said outer covering is positioned over said foundation assembly whereby said cloth material defines said exterior surface.

19. The visor assembly of claim 16 further comprising a plastic core member disposed between and secured to said flaps, said core member rotatably engaged with said support rod.

20. The visor assembly of claim 16 wherein said flaps have first and second transverse borders extending from said distal borders thereby said outer covering projects longitudinally beyond said transverse borders thereby forming first and second transversely extending yieldable strips each having a width of at least approximately 0.5 inches.

* * * * *

UNITED STATES PATENT AND TRADEMARK OFFICE
CERTIFICATE OF CORRECTION

PATENT NO : 5,984,398
DATED : December 9, 1999
INVENTOR(S): Willard E. Crotty, III It is certified that error appears in the above-identified patent and that said Letters Patent are hereby corrected as shown below:

Claim 20, Column 8, Line 17

[borders thereby] insert therefor --border to said hinge section, and--

Signed and Sealed this

Third Day of April, 2001

Attest:

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

| | | |
|---|---|---|
| PATENT NO. | : 5,984,398 | Page 1 of 1 |
| APPLICATION NO. | : 08/964605 | |
| DATED | : December 9, 1999 | |
| INVENTOR(S) | : Willard E. Crotty, III | |

It is certified that error appears in the above-identified patent and that said Letters Patent is hereby corrected as shown below:

Claim 20, Column 8, Line 17

"borders thereby" insert therefor --border to said hinge section, and--

Signed and Sealed this

Twenty-first Day of August, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 5,984,398 | |
| APPLICATION NO. | : 08/964605 | |
| DATED | : November 16, 1999 | |
| INVENTOR(S) | : Willard E. Crotty, III | |

It is certified that error appears in the above-identified patent and that said Letters Patent is hereby corrected as shown below:

Claim 20, Column 8, Line 17

"borders thereby" insert therefor --border to said hinge section, and--

This certificate supersedes Certificate of Correction issued August 21, 2007.

Signed and Sealed this

Second Day of October, 2007

JON W. DUDAS
*Director of the United States Patent and Trademark Office*